United States Patent Office 3,442,297
Patented May 6, 1969

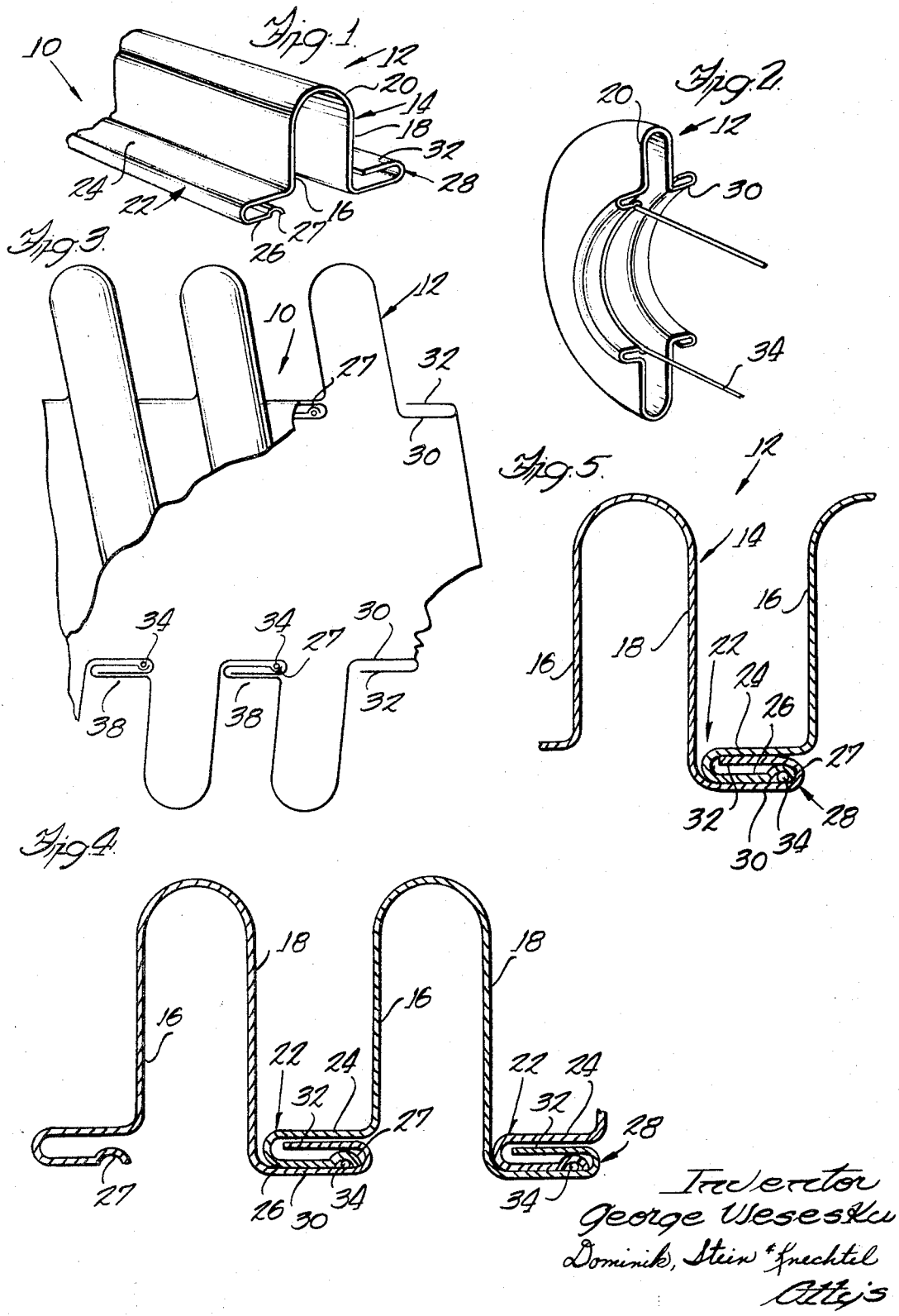

3,442,297
FLEXIBLE TUBING
George Wesesku, 135 Pleasant Ave.,
Bloomingdale, Ill. 60108
Filed Apr. 21, 1967, Ser. No. 632,669
Int. Cl. F16l 11/16; H01b 7/20
U.S. Cl. 138—122                                3 Claims

ABSTRACT OF THE DISCLOSURE

A wound flexible tubing which is fabricated from a flat ribbon strip that is formed to provide an upstanding rib and immovably fixed interlocked joints between the spirally wound length thereof. A packing can be included sandwiched between the flange forming the joints to provide an airtight joint.

---

This invention relates, in general, to tubing and, in particular, to flexible metal tubing.

Generally, flexible metal tubing presently is of two types: namely, that which is fabricated from a length of tubular material, hereinafter generally referred to as solid flexible tubing, and that which is fabricated from a flat ribbon wound strip of material, hereinafter referred to as wound flexible tubing. Solid flexible tubing generally is considerably more flexible than the wound flexible tubing and, furthermore, is air-tight. Accordingly, solid flexible tubing can be used to convey liquids, gases and the like, under high pressure without leakage. The solid flexible tubing often is used as conduit for the electrical wiring in aircraft, and for conveying hydraulic fluid through the hydraulic systems contained therein, as well as other similar applications. The primary disadvantages of solid flexible tubing is its cost and the fact that it can only be fabricated in short lengths. The high cost of the solid flexible tubing is attributable to the rather difficult process and the complex apparatus required to fabricate it. Its limited length results from the fact that the length of tubular material used in forming the tubing is, itself, limited and, furthermore, is reduced by approximately 50 percent or more during the forming operations. Generally, 6-foot lengths of tubular material are used, and these 6-foot lengths provide approximately 3 feet of solid flexible tubing. For this latter reason, solid flexible tubing also is quite heavy, in weight, in comparison to wound flexible tubing.

Being of relatively short length, it is apparent that a large number of couplers are required in any system of any extent, to couple the many short lengths of the solid flexible tubing together. These couplers usually are quite expensive and, in addition, substantially increase the possibility of leakage within the system.

It is also found that the solid flexible tubing can be fabricated of only a limited number of different types of material, whereas the wound flexible tubing can be fabricated of virtually any type of material, including steel, stainless steel, bronze, brass and aluminum. The problem of fabricating solid flexible tubing of aluminum at the present time is particularly acute since aluminum is preferred because of its light weight but the lengths of tubular material and hence the length of the flexible tubing which can be formed are restricted.

The diameters of the solid flexible tubing also are limited, due to the heavy weight of the tubing. If of a large diameter, the solid flexible tubing generally is too wieldy to be easily handled.

Wound flexible tubing has the several advantages set forth above, however, its primary disadvantages are that it is not air-tight and is considerably less flexible.

Accordingly, it is an object of the present invention to provide improved flexible metal tubing of the wound type.

Another object is to provide improved wound flexible tubing which is air-tight.

Still another object is to provide improved wound flexible tubing which is air-tight and which is inexpensively fabricated.

A still further object is to provide improved wound flexible tubing which is far more flexible than that which is presently generally available. In this respect, it is contemplated that the flexibility be comparable to or better than the flexibility of solid flexible tubing.

A still further object is to provide improved wound flexible tubing which can be used in applications where high pressures are encountered.

Still another object is to provide improved wound flexible tubing which can be fabricated from virtually any type of material.

Still another object is to provide improved wound flexible tubing which can be fabricated in long continuous lengths and, furthermore, can be fabricated with diameters ranging from a very small diameter to an extremely large diameter.

A still further object is to provide improved wound flexible tubing which can be fabricated on most presently used forming apparatus, with little modification to the apparatus.

Other objects of the invention will in part be obvious and will in part appear hereinafter.

The above objectives are accomplished with a wound flexible tubing which is fabricated from a flat ribbon strip that is formed to provide a relatively high upstanding concave-shaped rib having the opposite ends thereof reversely folded to form two outwardly projecting locking flanges which are open to the top and to the bottom rib, respectively. One of the locking flanges has a packing groove formed in one of its walls, for receiving therein a packing. The locking flanges interlock with one another when the strip is being wound, with the packing in the packing groove sandwiched therein, to provide a wound flexible tubing which is air-tight and is extremely flexible, in comparison to presently available wound flexible tubing. The wound flexible tubing can be formed in long continuous lengths, of virtually any type of material, and in various size diameters, from very small to extremely large diameters.

The invention accordingly comprises an article of manufacture possessing the features, properties, and the relation of elements which will be exemplified in the article hereinafter described, and the scope of the invention will be indicated in the claims.

For a fuller understanding of the nature and objects of the invention, reference should be had to the following detailed description taken in connection with the accompanying drawing in which:

FIG. 1 is a partial perspective view of a formed ribbon strip from which the wound flexible tubing is fabricated;

FIG. 2 is a partial perspective view, generally illustrating the configuration of the formed wound flexible tubing;

FIG. 3 is a plan view of a length of the wound flexible tubing, partially broken away to illustrate its air-tight interlock construction;

FIG. 4 is a partial sectional view of the wound flexible tubing expanded to illustrate the interlock construction before it is compressed to form the air-tight joints; and FIG. 5 is a partial sectional view of the wound flexible tubing illustrating the compressed interlock joints thereof.

Similar reference characters refer to similar parts throughout the several views of the drawing.

Referring now to the drawing, the wound flexible tubing 10 (FIG. 3) is fabricated from a continuous length of flat ribbon-like material which is formed using standard techniques and apparatus well-known in the industry to have generally the configuration of the short length of formed material 12 shown in FIG. 1. The formed material 12 is fed, in a continuous length, to apparatus which spirally winds it to form a continuous length of flexible tubing 10. In this case also, the standard techniques and the apparatus used in the industry for spirally winding the formed material 12 can be used, with only slight modification, as described below.

The formed material 12 has a relatively high upstanding rib 14 which has side walls 16 and 18 that extend in flat parallel relation for a portion of their lengths and flow into and join with the rounded, concave-shaped top wall 20. The lower edge of the side wall 16 is extended and reversely folded to form a locking flange 22 having a top wall 24 which is integrally affixed to and extends outwardly substantially perpendicular to the side wall 16 and a bottom wall 26 which extends substantially parallel to the top wall 24. The bottom wall 24 has a packing groove 27 in the form of a concave-shaped recess at its end, along its entire length.

The lower edge of the side wall 18 likewise is extended and reversely folded to form another locking flange 28 having a bottom wall 30 which is integrally affixed to and extends outwardly substantially perpendicular to the side wall 18 and a top wall 32 which extends substantially parallel to the bottom wall 30. It may be noted that the locking flange 22 opens below the formed member 12 whereas the locking flange 28 opens towards its top. Also, the top and bottom walls 24, 32 and 26, 30, respectively, are in the same horizontally spaced planes.

The formed material 12 is continuously fed to the apparatus for spirally winding it, which apparatus is further adapted to interlock the locking flanges 22 and 28, in the well-known manner, to form a continuous length of flexible tubing, as generally illustrated in FIG. 3. During this operation, a packing 34 (FIG. 2) is simultaneously fed to the apparatus and recessed into the packing groove 27, as illustrated in FIGS. 2–5. As can be best seen in FIG. 4 which is a partial sectional view of the interlocked locking flanges 22 and 28 before they are compressed, the packing 34 is sandwiched in the packing groove 27 and between the bottom wall 30 of the locking flange 28 and the bottom wall 26 of the locking flange 22, when the formed material 12 is spirally wound. Thereafter, the locking flanges 22 and 28 are compressed, as illustrated in FIG. 5, to secure and lockingly engage their respective walls in a substantially fixed, immovable position with respect to one another. The packing 34 is sandwiched therein and assures that an air-tight joint is provided.

The flexible tubing 10 generally resembles solid flexible tubing in that it has relatively deep, closely spaced grooves 38 between each of the ribs 14, which grooves, of course, extend spirally along the length of the flexible tubing. Unlike presently available wound flexible tubing which depends upon the slidability of the interlocked locking flanges for its flexibility, the flexibility of the flexible tubing 10 of the present invention is made dependent upon the flexibility of the side walls 16 and 18. That is, as the flexible tubing 10 is bent into a curved configuration, the walls of the locking flanges 22 and 28 are immovably affixed together while the side walls along the outer radius of curvature are caused to spread apart and the side walls along the inner radius of curvature are bent toward one another. Accordingly, the greater the length of the side walls 16 and 18 the greater the flexibility will be since the side walls along the outer radius of curvature can be spread farther apart. The limit of flexibility is, of course, controlled to some degree upon the extent to which the side wall along the inner radius of curvature can be compressed. This latter factor is, in turn, controlled by the span between the side walls 16 and 18. A preferred construction is to form the ribs 14 so that the height thereof is equal to twice the width, and with a spacing between the ribs substantially equal to the width of a rib. If these proportionate relationships are followed, a strong, extremely flexible tubing is provided which has characteristics that are comparable to or better than those of the solid flexible tubing presently available.

The top and bottom walls 24, 32 and 26, 30, respectively, of the locking flanges 22 and 28, being immovably affixed together and further having the packing 34 therein assures that the interlocked joints are air-tight and, further, will withstand high pressure liquids or gases without leakage.

As indicated above, the flexible tubing 10 can be fabricated of virtually any type of material including steel, stainless steel, bronze, brass and aluminum. It further can be formed in continuous lengths and with diameters ranging from a very small diameter to an extremely large diameter. The flexible tubing is far more flexible than the wound flexible tubing presently available. In fact, its flexibility is comparable to or better than the flexibility of solid flexible tubing.

The packing 34 forms an air-tight joint between the spirally-wound interlocked length of formed material 12 so that the flexible tubing 10 can be used in numerous applications where wound flexible tubing could not be used in the past. The packing may be cotton cord, plastic, wire and, in cases where extreme heat is encountered, asbestor or, in cases where extremely high pressure is encountered, metal braid. Accordingly, the particular packing 34 used is dependent, to some degree, on the application of the flexible tubing and/or the environment in which it is used.

Being formed of flat ribbon-like material, the length of the flexible tubing 10 is not limited. Accordingly, aluminum flexible tubing now can be formed in virtually unlimited lengths and the prior problems existing in providing long lengths of flexible tubing of aluminum is overcome. The flexible tubing 10, particularly when fabricated of aluminum material, is light weight in comparison to solid flexible tubing, and provides substantially the same advantages and can be used in place of it in almost every application.

It will thus be seen that the objects set forth above among those made apparent from the preceding description, are efficiently attained and, since certain changes may be made in the above article without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. In a length of wound flexible tubing of the type fabricated from a length of flat ribbon-like material which is formed to provide a cross-sectional configuration having an upstanding outwardly directed rib having side walls and integral locking flanges on the lower ends of each of the opposite sides of said rib which interlock to form an interlocked joint to provide a continuous length of flexible tubing as said formed material is spirally wound, the improvement comprising extending the length of said side walls of said rib so as to provide side walls of a height substantially at least as high as the width of the interlocked joint between each of said ribs, said interlocked joint being tightly compressed together so as to be air tight and immovable whereby the flexibility of said length of flexible tubing is made solely dependent upon the height of said walls of said ribs and the bending thereof toward and away from one another.

2. The length of wound flexible tubing of claim 1 further including the improvement of providing a packing groove in one wall of one of said locking flanges along its length and providing a packing material within said packing groove and sandwiching the same between one wall of each of said locking flanges.

3. The length of wound flexible tubing of claim 1, wherein the height of said ribs is substantially equal to twice the width thereof.

References Cited

UNITED STATES PATENTS

| 1,476,704 | 12/1923 | Fulton | 138—136 |
| 1,570,886 | 1/1926 | Fulton et al. | 138—136 |
| 3,094,147 | 6/1963 | Nemer | 138—122 |
| 3,331,400 | 7/1967 | Vilkaitis | 138—122 X |

HENRY S. JAUDON, *Primary Examiner.*

U.S. Cl. X.R.

138—135, 136